US011839850B2

(12) United States Patent
Duval et al.

(10) Patent No.: US 11,839,850 B2
(45) Date of Patent: Dec. 12, 2023

(54) SYSTEM FOR THE CHEMICAL DECONTAMINATION OF CORROSIVE GASES

(71) Applicant: PREVOR INTERNATIONAL, Paris (FR)

(72) Inventors: Aurélien Duval, Rueil Malmaison (FR); Joel Blomet, Valmondois (FR); Marie Claude Meyer, Paris (FR)

(73) Assignee: PREVOR INTERNATIONAL, Paris (FR)

( * ) Notice: Subject to any disclaimer, the term of this patent is extended or adjusted under 35 U.S.C. 154(b) by 0 days.

(21) Appl. No.: 17/791,774

(22) PCT Filed: Jan. 8, 2021

(86) PCT No.: PCT/FR2021/050029
§ 371 (c)(1),
(2) Date: Jul. 8, 2022

(87) PCT Pub. No.: WO2021/140304
PCT Pub. Date: Jul. 15, 2021

(65) Prior Publication Data
US 2023/0043563 A1 Feb. 9, 2023

(30) Foreign Application Priority Data

Jan. 10, 2020 (FR) ...................... 2000212

(51) Int. Cl.
*B01D 53/58* (2006.01)
*B01D 53/68* (2006.01)
*B01D 53/78* (2006.01)
*B01D 53/81* (2006.01)
*B01D 53/06* (2006.01)

(52) U.S. Cl.
CPC ............ *B01D 53/78* (2013.01); *B01D 53/06* (2013.01); *B01D 53/58* (2013.01); *B01D 53/81* (2013.01); *B01D 2251/304* (2013.01); *B01D 2251/70* (2013.01); *B01D 2251/80* (2013.01); *B01D 2251/902* (2013.01); *B01D 2257/2045* (2013.01); *B01D 2257/406* (2013.01)

(58) Field of Classification Search
CPC ........ B01D 53/78; B01D 53/58; B01D 53/68; B01D 53/81; B01D 2251/304; B01D 2251/70; B01D 2251/80; B01D 2251/902; B01D 2257/2045; B01D 2257/406; B01D 2258/06; A61L 9/00; A61L 9/01; A61L 9/015; A61L 9/14; A61L 2101/00; A61L 2209/00; A61L 2209/10; A61L 2209/21
See application file for complete search history.

(56) References Cited

U.S. PATENT DOCUMENTS

| | | | |
|---|---|---|---|
| 2,031,802 A | 2/1936 | Tyrer | |
| 3,757,488 A * | 9/1973 | Austin | B01D 53/501 423/242.3 |
| 5,270,025 A | 12/1993 | Ho et al. | |
| 10,343,111 B2 | 7/2019 | Byers et al. | |
| 2005/0008531 A1* | 1/2005 | Parkhurst | B01D 53/1493 422/123 |
| 2012/0107209 A1* | 5/2012 | Vera-Castaneda | B01D 53/1481 423/539 |

FOREIGN PATENT DOCUMENTS

| | | | | |
|---|---|---|---|---|
| CN | 207 769 539 U | * | 8/2018 | |
| CN | 109 603 772 A | * | 4/2019 | ............. A41D 13/11 |
| CN | 110575723 A | | 12/2019 | |
| CN | 211 677 091 U | * | 10/2020 | |
| CN | 112 763 285 A | * | 5/2021 | ............. B08B 1/002 |
| DE | 2707935 A1 | | 8/1978 | |
| EP | 3476474 A1 | | 5/2019 | |
| FR | 2236546 A1 | | 2/1975 | |
| FR | 2 960 446 A1 | * | 12/2011 | ............. B01D 53/72 |
| KR | 2020 078 270 A | * | 7/2020 | ............. B01D 45/02 |
| WO | 2013137452 A1 | | 9/2013 | |
| WO | 2018143186 A1 | | 8/2018 | |
| WO | 2019112571 A1 | | 6/2019 | |
| WO | 2019113434 A1 | | 6/2019 | |
| WO | 2019133801 A1 | | 7/2019 | |
| WO | 2019150301 A1 | | 8/2019 | |

OTHER PUBLICATIONS

International Search Report dated May 11, 2021, in corresponding to International Application No. PCT/FR2021/050029; 7 pages (with English Translation).

* cited by examiner

*Primary Examiner* — Timothy C Vanoy
(74) *Attorney, Agent, or Firm* — Maier & Maier, PLLC (57) ABSTRACT

The use of a composition including at least one acido-basic neutralising agent for decontaminating an atmosphere contaminated by a corrosive gas, the acido-basic neutralising agent having at least 2 pKa's and being characterised by: pKa 1≤pKa 2, pKa 1>2, pKa 2<12, 4<½ (pKa 1+pKa 2)<10 pKa 1, representing the smallest of the basic pKa's and pKa 2 representing the largest of the acidic pKa's. Also, a method for decontaminating an atmosphere contaminated by a corrosive gas comprising the spraying of the neutralising agent, and to a decontamination device.

11 Claims, 3 Drawing Sheets

SYSTEM FOR THE CHEMICAL DECONTAMINATION OF CORROSIVE GASES

FIELD

The invention relates to the field of the chemical decontamination of an atmosphere. More precisely, it relates to the use of a composition comprising an acido-basic neutralising agent for decontaminating an atmosphere contaminated by a corrosive gas. The present invention also relates to a decontamination method comprising said composition.

BACKGROUND

Chemical contamination of an atmosphere by corrosive acid or base gases may occur during chemical accidents, for example when pipes or cylinders containing corrosive gases are damaged or pierced.

Chemical contamination of an atmosphere may also occur during leaks or spillages of liquid chemical products emitting corrosive vapours.

In such cases, the surrounding atmosphere is then contaminated by these corrosive gases or vapours.

A person skilled in the art then has only a few options for decontaminating the atmosphere and to make it secure and once again suitable for work.

When this chemical contamination takes place in a closed space, it is possible to ventilate, via openings to the outside to discharge the contaminant, i.e. the corrosive gases or vapours. Such a solution has an ecological drawback since this entrains the chemical contaminant to the outside and then causes environmental pollution. On the other hand, such a solution is not applicable in the case of a space with no openings to the outside.

If the space is provided with a forced ventilation system, it is possible to aspirate the contaminated air and to pass it through a filter in which the contaminant will be trapped. However, this requires expensive equipment for the building upstream in the case of potential incidents.

During fires emitting harmful or corrosive gases, it is fairly frequent for fire-fighters to produce a curtain of water so as to dissolve the gases in the water and thus prevent propagation thereof. However, the consequence of this is generating a large quantity of contaminated liquid waste and completely flooding the area affected.

Apart from the use of natural elements, chemical decontamination methods have been developed for decontaminating an atmosphere.

Thus, in the case of biological contamination of the atmosphere, for example by microorganisms, decontamination systems based on the spraying into the area of a solution of ozone, of peracetic acid (WO2018/143186) or of dry hydrogen peroxide (WO2019/133801) can be used.

When the contamination of the atmosphere is due to an organic compound, there are systems for injecting gaseous methanol put in contact with a catalyst to transform it into hydroxyl, hydroperoxy or hydroxymethyl radicals that will then react with the organic compound to make it non-toxic (WO2013/137452). These systems require the use of methanol and of radicals harmful to the health and make it possible only to degrade volatile compounds.

During a chemical contamination, decontamination solutions have been developed for cases where the contaminant is in liquid or solid form.

Thus chloro-oxidising solutions based on hypochlorite ions ClO⁻ or hypochloric acid HClO were developed for decontaminating formaldehyde residues (WO2019/150301).

It has also been shown that gaseous ozone made it possible to decontaminate overalls of fire-fighters contaminated by carcinogenic products resulting from combustion during a fire (WO 2019/113434). For decontaminating overalls contaminated by polycyclic aromatic hydrocarbons such as benzo(a)pyrene, solutions or liquid dispersions based on cerium salts in water were developed (WO2019/112571).

Mention can also be made of reactive chemical absorbents based on silica, active carbon and zeolite for contaminating warfare chemical agents in liquid form (patent EP3476474).

Physiological solutions based on complexed amphoteric agents have also been described for decontaminating parts of the human or animal body contaminated by a corrosive or irritant product.

It was therefore necessary to develop a method for decontaminating an atmosphere contaminated by corrosive gases based on the use of products that are non-toxic for humans, that are easy to use and that make it possible to avoid the propagation of the contamination in the environment.

SUMMARY

The present invention relates to the use of a composition comprising at least one acido-basic neutralising agent for decontaminating an atmosphere contaminated by a corrosive gas, said acido-basic neutralising agent having at least 2 pKa's and being characterised in that:

$pKa\ 1 \leq pKa\ 2$
$pKa\ 1 > 2$
$pKa\ 2 < 12$
$4 < \frac{1}{2}(pKa\ 1 + pKa\ 2) < 10$ pKa 1 representing the smallest of the basic pKa's and pKa 2 representing the largest of the acidic pKa's.

BRIEF DESCRIPTION OF THE FIGURES

FIG. 5 is a graph showing the change in the concentration in gaseous NH₃ (ppm) according to the volume (mL)

sprayed of a composition comprising a EDTA-aluminium disodium complex and sodium glutamate in an equimolar mixture at 0.5 mol/L.

Within the meaning of the present application, "corrosive gas" means a gas causing corrosion in contact therewith, i.e. an alteration to a material or alterations to the skin when it is a case of living beings (irritations, chemical lesions, for example) through its acidic or basic character. Within the meaning of the present invention, the term "corrosive gas" encompasses corrosive vapours emitted by certain liquid chemical products. Thus, within the meaning of the invention, corrosive gases include acids and bases. By way of example, mention can be made of ammonia ($NH_3$), hydrogen chloride (HCl), sulphur trioxide and hydrogen fluoride, hydrogen iodide, acetic acid, hydrogen sulphide, hydrogen cyanide. Corrosive gases also include gaseous chemical products which, in contact with the moisture of the air or of the skin, hydrolyse into an acid or into a base, such as dibromium ($Br2$), which hydrolyses into hydrogen bromide (HBr), a toxic and highly corrosive colourless gas. Corrosive gases also include volatile amines, such as ethanolamines such as for example tiethanolamine and alkylamines such as for example diethylamine.

"Atmosphere" means an atmosphere of a location able to receive humans or animals such as for example a warehouse, a hangar, a building or a room.

A contaminated atmosphere may occur in the case of a chemical accident with a gas leak or during leaks or spillages of liquid chemical products emitting corrosive vapours. In such cases, the surrounding atmosphere is then contaminated by these corrosive gases or vapours.

The composition according to the invention makes it possible to decontaminate large volumes of atmosphere, such as in the case of contamination of a room, warehouse or building. In this, the composition is effective for treating a substantial rate of gas to decontaminate such large atmospheres. By way of example, a 1000 $m^2$ warehouse and 6 m high (conventional warehouse) can be decontaminated in 5 min, at a treatment rate of 72,000 $m^3$/h of contaminated air with the composition according to the invention.

In addition, the composition according to the invention allows for a decontamination without knowing the parameters of the contaminating gas in question (source of emission, concentration, rate, nature).

"Decontamination" means that the concentration in corrosive gas in the atmosphere has fallen to the threshold or below regulatory values for long-term exposure such as the occupational exposure limits (OELs) defined by the directives of the European Union. In this regard, mention can be made of Directives 98/24/EC, 2000/39/EC, 2006/15/EC, 2009/161/EU, (EU) 2017/164, 2004/37/EC, (UE) 2017/2398 and (UE) 2019/130.

The value of the regulatory threshold will depend on the nature of the gas.

Table 1 hereinbelow provides the exposure limit value not to be exceeded for an exposure of 8 h, for certain corrosive gases. These values were defined by European or national directives.

TABLE 1

Exposure limit value (ppm) not to be exceeded for an exposure of 8 h for certain corrosive gases

| Corrosive gas | Exposure limit value (ppm) |
|---|---|
| Ammonia ($NH_3$) | 20 |
| Hydrogen chloride (HCl) | 5 |
| Sulphur trioxide | 5 |
| Hydrogen fluoride (HF) | 1.8 |
| Hydrogen iodide | 0.01 |
| Acetic acid | 10 |
| Hydrogen sulphide | 5 |
| Hydrogen cyanide | 0.9 |
| Hydrogen bromide (HBr) | 2 |
| Ethanolamines (Triethanolamine) | 0.5 |
| Alkylamines (Diethylamine) | 5 |

The exposure limit values not to be exceeded for an exposure of 8 h according to the chemical species may be found on the website of the IFA (Institute for Occupational Safety and Health of the German Social Accident Insurance) at the following address: https://limitvalue.ifa.dguv.de/

Thus, in a particular embodiment, "decontamination" means that the concentration in corrosive gas in the atmosphere is less than or equal to 20 ppm, in particular less than or equal to 10 ppm, more particularly less than or equal to 5 ppm, even more particularly less than or equal to 1 ppm.

"Decontamination" means that the concentration in corrosive gas in the atmosphere was reduced by at least 70%, in particular by at least 90%, more particularly by at least 95%.

The decontamination may also be appreciated by toxicological values by inhalation such as the Derived no effect level (DNEL) by inhalation over the long term. The latter are provided in the REACH registration dossiers of substances following the tests conducted.

The decontamination may also be appreciated by a pH of the residues between 4 and 9, for example with a coloured indicator or a pH-meter.

In a particular embodiment, said acido-basic neutralising agent is a buffer solution and is characterised in that:
pKa 1=pKa 2
pKa 1>2
pKa 2<12
4<½ (pKa 1+pKa 2)<10,
pKa 1 representing the smallest of the basic pKa's and pKa 2 representing the largest of the acidic pKa's.

In a particular embodiment, said acido-basic neutralising agent is characterised in that:
pKa 1≤pKa 2
pKa 1>2
pKa 2<12
4<½ (pKa 1+pKa 2)<10,
pKa 1 representing the smallest of the basic pKa's and pKa 2 representing the largest of the acidic pKa's.

In a particular embodiment, said acido-basic neutralising agent is an amphoteric agent.

Within the meaning of the present application, "amphoteric agent" means a chemical species possessing both the acidic function and the basic function and consequently having at least two dissociation constants (pKa), one corresponding to the acid function and the other corresponding to the basic function.

Typically, the amphoteric agent is selected from the group consisting of: an amino acid or an amino acid salt, a citric acid salt, a phosphoric acid salt, a pyrophosphoric acid salt, an ethylenediaminetetraacetic acid (EDTA) salt, complexed or free, an ascorbic acid salt, or a carbonate.

In a particular embodiment, the amphoteric agent is an ascorbic acid salt, for example sodium ascorbate.

In a particular embodiment, the amphoteric agent is an amino acid, for example L-alanine.

In a particular embodiment, the amphoteric agent is an EDTA salt, for example EDTA disodium.

In a particular embodiment, the amphoteric agent is an amino acid salt, more particularly a glutamate salt, for example sodium glutamate.

In a particular embodiment, the amphoteric agent is a carbonate, more particularly a hydrogencarbonate, in particular sodium hydrogencarbonate.

In a particular embodiment, the amphoteric agent is used at a concentration of at least 0.01 mol/L and within the limit of solubility of the amphoteric agent. For example, it is used at a concentration of between 0.01 mol/L and 10 mol/L, in particular between 0.1 and 5 mol/L, more particularly between 0.1 and 2 mol/L, even more particularly at 1 mol/L or 0.5 mol/L.

In a particular embodiment, the composition contains two amphoteric agents, as defined previously.

In a particular embodiment, the two amphoteric agents are a complexed EDTA salt such as an EDTA-aluminium disodium complex, and an amino acid salt, more particularly a glutamate salt, for example sodium glutamate.

In a particular embodiment, said acido-basic neutralising agent is a mixture of at least one conjugate base of an acid and at least one conjugate acid of a base.

Typically, the conjugate base and the conjugate acid are used at a concentration of at least 0.01 mol/L and within the limit of their solubility. For example, they are used at a concentration of between 0.01 mol/L and 10 mol/L, in particular between 0.1 mol/L and 5 mol/L, more particularly 1 mol/L or 0.5 mol/L.

In one embodiment, said conjugate acid and said conjugate base are present in an equimolar ratio.

In a particular embodiment, said conjugate base is an EDTA-aluminium disodium complex and the conjugate acid is boric acid.

Within the meaning of the present application, "EDTA-aluminium disodium complex" means a disodium salt of a complex based on aluminium and ethylenediaminetetraacetic acid having the general formula $[Al(Y)Bn]c'Dc$ with B representing $OH-$, $BO^{2-}$, $H^+$, Y representing a tetracarboxylate that can be protonated four times to form ethylenediaminetetraacetic acid, n representing an integer number equal to 0, 1, 2 or 3, D being a counter-ion, preferably $Na+$, c being an integer number equal to 2 and c' being a relative number having the same absolute value as c.

In one embodiment, the acido-basic neutralising agent makes it possible to chelate ligands, in particular fluoride ions. This is because some gases can release ions having a toxic effect on the organism. Such is the case with fluoride ions, which can come in particular from gaseous hydrogen fluoride, which bind to the calcium and to the magnesium of the organism when inhaled, and can thus cause systemic malfunctioning that can lead to cardiac arrest.

Thus, in a particular embodiment, the neutralising agent has electrophilic properties so that the fluoride ion $F^-$ can fix thereon. The bond between the electrophilic neutralising agent and $F^-$ must be stronger than that between $F^-$ and $Ca^{2+}$ or $F^-$ and $Mg^{2+}$ so that $F^-$ preferentially binds to the electrophilic neutralising agent and not to the calcium or magnesium of the human body.

A person skilled in the art is able without difficulty to select a neutralising agent as defined above and having strength allowing a bond with a fluoride ion that is stronger than that between a fluoride ion and $Ca^{2+}$ and that between a fluoride ion and $Mg^{2+}$.

Furthermore, the composition according to the present invention may comprise at least one additive selected from surfactants, pH indicators, preservatives, and mixtures thereof. A person skilled in the art is able to select, from all these possible additives, both the composition and the quantity of those that will be added to the composition, so that the latter keeps all its properties.

Within the meaning of the present application, "surfactant" means an agent for stabilising the composition or allowing mixing thereof with an organic solvent.

The surfactant may be hydrophobic with an HLB of 3 to 10 or hydrophilic with an HLB of 11 to 18. The HLB (from the English "hydrophilic lipophilic balance") of the surfactant or of the mixture of surfactants will be determined by the Griffin method (Griffin WC: Classification of Surface-Active Agents by 'HLB', Journal of the Society of Cosmetic Chemists 1 (1949): 311. Griffin WC: Calculation of HLB Values of Non-Ionic Surfactants, Journal of the Society of Cosmetic Chemists 5 (1954): 259).

Examples of surfactants are ethoxylated fatty alcohols, fatty acids and esters (for example: ceteareth-12, ceteareth-20, ceteareth-33, ethoxylated (20 moles) cetyl stearyl alcohol, polyglyceryl-2 polyhydroxystearate, glyceryl oleate, sorbitan ester, glycerol ester, PEG-mono/di-laurate, PEG-mono/di-stearate, cetearyl isononanoate, glyceryl stearate, etc), carboxylates, ethoxy carboxylates (for example: sodium/potassium stearate, alkyl-carboxylic acid, alkyl-polyglycol ether carboxylic acid, alkylphenol polyglycol ether carboxylic acid, carboxymethylated alcohol, ethoxy carboxylate, ether carboxylate, etc.), octoxynol, capryl caprilyl glucoside, and mixtures thereof.

In one embodiment, the composition according to the invention comprises a quantity of surfactant of 0.1% to 10% by weight, preferably 0.5 to 5% by weight, and more preferentially still from 1 to 3% by weight of the total weight of the composition.

Within the meaning of the present application, "pH indicator" means a compound that has the ability to change colour according to the pH of its surrounding environment.

Examples of pH indicators are thymol blue, tropaeolin, bromocresol purple, bromophenol blue, Congo red, neutral red, phenolphthalein, thymolphthalein, alizarin yellow R, bromothymol blue, cresol red, methyl violet, malachite green, methyl yellow, Congo red, methyl orange, bromocresol green, methyl red, phenol red, alizarin, indigo carmine and mixtures thereof.

The presence of a pH indicator makes it possible to view the complete neutralisation of the gas to be depolluted, using the correct quantity of composition necessary, and thus to reduce the cost of decontamination.

Within the meaning of the present application, "preservative" means an agent for limiting the development of microorganisms within the composition. More particularly they make it possible to stop or inhibit the growth of microorganisms. The concentrations used are bacteriostatic. The combination of an antibacterial (ATB) and an antifungal agent (ATF) may be necessary.

Thus, adding at least one preservative makes it possible to obtain a composition not allowing the growth and multiplication of bacteria, fungi and/or mold.

Examples of preservatives are para-hydroxybenzoic alkyl ester, isothiazolinone, imidazolidinyl urea, diazolidinyl urea, methylparaben, propylparaben, propylene glycol, bromo-nitro-propanediol, phenoxyethanol, sorbic acid and salts thereof, benzoic acid and salts thereof, phenoxyethanol, benzyl alcohol, and mixtures thereof. These compounds are generally between 0.01% and 0.5% of the total weight of the composition.

In order to prevent or limit the development of microorganisms, the composition may also be a sterile composition. A sterile composition can be obtained according to methods well known to a person skilled in the art. It is next stored under sterile conditions until use.

In a particular embodiment, said composition is in the form of a solution, also called liquid.

The composition may be in the form of an aqueous solution. In particular, said composition comprises from 20% to 99.9% water, more particularly 60 to 95%%, typically 75%.

The composition may also be in solution in an organic solvent. In particular, said composition comprises from 20 to 99.9% organic solvent, more particularly 60 to 95%, typically 75%.

By way of example, the organic solvent may be a fatty acid ester, a linear alkane, a cyclic alkane, a glycol ether or a glycol ether ester.

In an embodiment, said composition in the form of a solution is formulated in the form of a foam.

In one embodiment, said composition is in solid form. In particular, it may be in the form of solid particles, also referred to as powder. The powder may be diluted in a neutral powder.

In one embodiment, said composition in solution form or in solid form may be formulated in aerosol form.

Within the meaning of the present application, "aerosol" means that the composition is in the form of a colloid of liquid drops in suspension in a carrier gas or that it is in the form of a colloid of solid particles in suspension in a carrier gas. Typically, the carrier gas is a neutral gas such as nitrogen, air or compressed air.

In one embodiment, the composition according to the invention described above is sprayed directly into the atmosphere contaminated by corrosive gases.

The present invention also relates to a method for decontaminating an atmosphere contaminated by a corrosive gas comprising the following steps:
1) spraying, directly into the contaminated atmosphere, a composition comprising at least one acido-basic neutralising agent for decontaminating an atmosphere contaminated by a corrosive gas, said acido-basic neutralising agent having at least 2 pKa's and being characterised in that:
   pKa 1≤pKa 2
   pKa 1>2
   pKa 2<12
   4<½ (pKa 1+pKa 2)<10
pKa 1 representing the smallest of the basic pKa's and pKa 2 representing the largest of the acidic pKa's; then
2) checking the decontamination;
3) optionally repeating steps 1 and 2 until there is total decontamination;
4) recovering the solid or liquid residues;
5) optionally rinsing the decontaminated zone to eliminate the residues of the composition.

In one embodiment of the method, step 1) is triggered manually.

In one embodiment of the method, step 1) is triggered automatically.

Step 1) may be preceded by detecting a gas in the atmosphere, in particular via a gas-detection system.

In a particular embodiment, said acido-basic neutralising agent used at step 1) is a buffer solution and is characterised in that:
   pKa 1=pKa 2
   pKa 1>2
   pKa 2<12
   4<½ (pKa 1+pKa 2)<10,
pKa 1 representing the smallest of the basic pKa's and pKa 2 representing the largest of the acidic pKa's.

In a particular embodiment, said acido-basic neutralising agent used at step 1) is characterised in that:
   pKa 1<pKa 2
   pKa 1>2
   pKa 2<12
   4<½ (pKa 1+pKa 2)<10,
pKa 1 representing the smallest of the basic pKa's and pKa 2 representing the largest of the acidic pKa's.

In a particular embodiment, said acido-basic neutralising agent used at step 1) is an amphoteric agent. In particular, the amphoteric agent is selected from the group consisting of: an amino acid or an amino acid salt, a citric acid salt, a phosphoric acid salt, a pyrophosphoric acid salt, an ethylenediaminetetraacetic acid (EDTA) acid salt, complexed or free, an ascorbic acid salt, or a carbonate.

In a particular embodiment, the amphoteric agent is an ascorbic acid salt, for example sodium ascorbate.

In a particular embodiment, the amphoteric agent is an amino acid, for example L-alanine.

In a particular embodiment, the amphoteric agent is an EDTA salt, for example EDTA disodium.

In a particular embodiment, the amphoteric agent is an amino acid salt, more particularly a glutamate salt, for example sodium glutamate.

In a particular embodiment, the amphoteric agent is a carbonate, more particularly a hydrogencarbonate, in particular sodium hydrogencarbonate.

In a particular embodiment, the amphoteric agent is used at a concentration of at least 0.01 mol/L and within the soluble limit of the amphoteric agent. For example, it is used at a concentration of 0.01 mol/L and 10 mol/L, in particular between 0.1 and 5 mol/L, more particularly between 0.1 and 2 mol/L, even more particularly at 1 mol/L or 0.5 mol/L.

In a particular embodiment, the composition contains two amphoteric agents. In particular, the two amphoteric agents are a complexed EDTA salt such as an EDTA-aluminium disodium complex, and an amino acid salt, more particularly a glutamate salt, for example sodium glutamate.

In a particular embodiment, said acido-basic neutralising agent used at step 1) is a mixture of at least one conjugate base of an acid and at least one conjugate acid of a base.

Typically, the conjugate base and the conjugate acid are used at a concentration of at least 0.01 mol/L and in the limit of their solubility. For example, they are used at a concentration of between 0.01 mol/L and 10 mol/L, in particular between 0.1 mol/L and 5 mol/L, more particularly 1 mol/L or 0.5 mol/L.

In one embodiment, said conjugate acid and said conjugate base are present in an equimolar ratio.

In a particular embodiment, said conjugate base is an EDTA-aluminium disodium complex and the conjugate acid is boric acid.

In one embodiment, the acido-basic neutralising agent used at step 1) has the possibility of chelating ligands, in particular fluoride ions.

Furthermore, the composition used at step 1) may optionally contain at least one additive selected from surfactants, pH indicators, preservatives, and mixtures thereof, as defined in the present application.

In order to prevent or limit the developments of micro-organisms, the composition may also be a sterile composition, sterilised in accordance with methods well known to a person skilled in the art.

In one embodiment, the composition used at step 1) is in the form of a solution, such as an aqueous solution, or in a solution in an organic solvent.

In one embodiment, it may also be in solid form, in particular in powder form.

In a particular embodiment, the composition is sprayed in the form of a solution, in solid form, for example powder, in powder form, in foam form and/or in aerosol form.

The composition may be sprayed by means of a sprinkler, also referred to as a spray nozzle.

Figure 1:
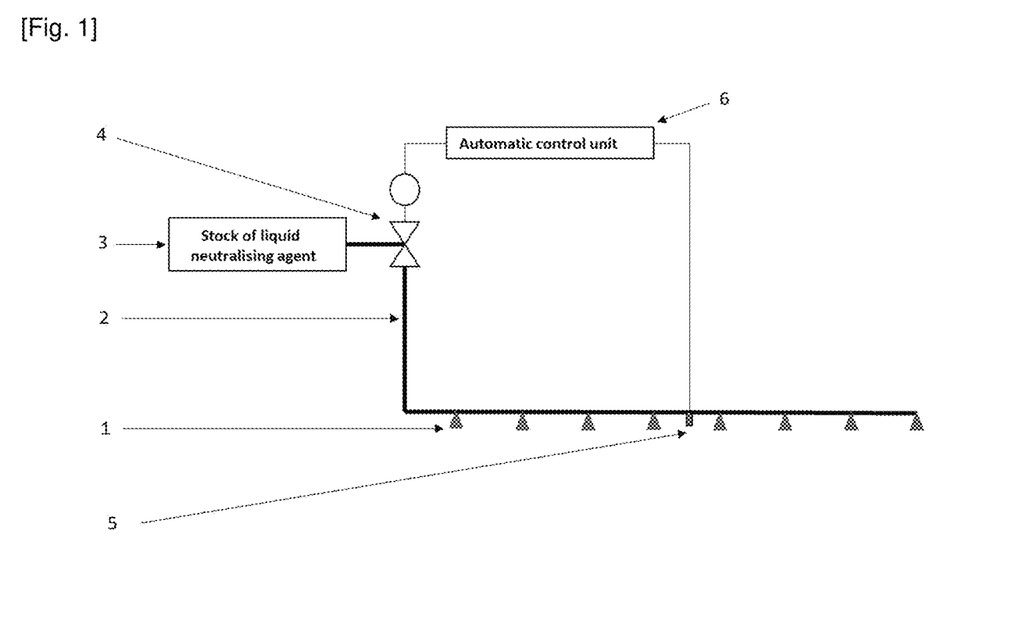
FIG. 1 shows a device for decontaminating an atmosphere comprising sprinklers 1 connected to a water circuit 2, itself being connected via a valve 4 to a reservoir 3 able to receive a composition in aqueous form, said valve 4 being coupled to a gas detection system 5 via an automatic control unit 6, for automatic actuation.
Figure 2:
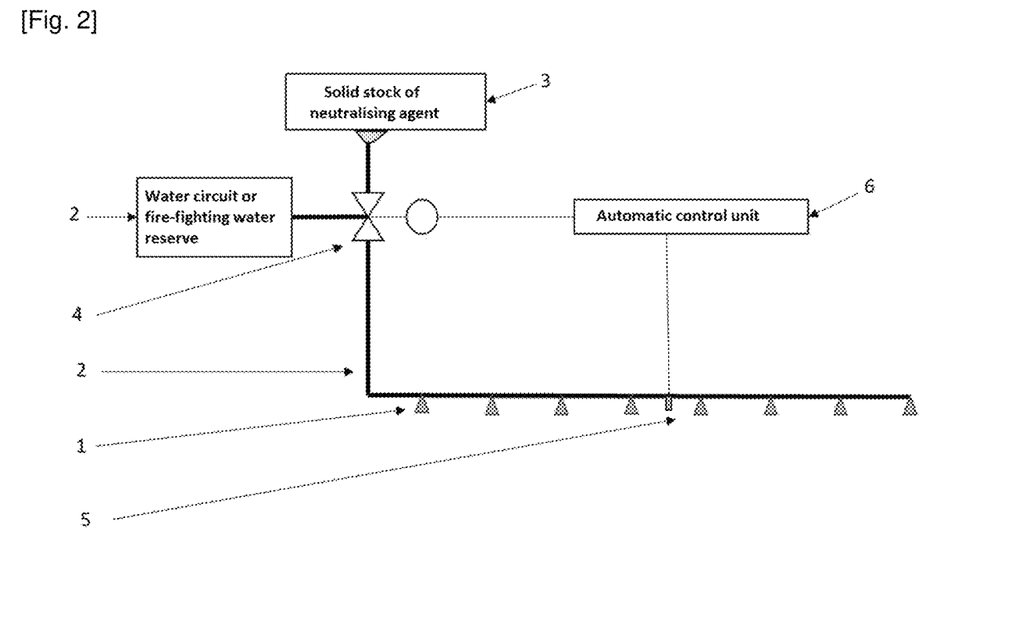
FIG. 2 shows a device for decontaminating an atmosphere comprising sprinklers 1 connected to the water circuit 2, itself being connected via a valve 4 to a reservoir 3 able to receive a composition in solid form, by means of a valve 4 located at the junction of the reservoir 3 and the water circuit 2, said valve 4 being coupled to a gas detection system 5 via an automatic control unit 6, for automatic actuation.

The composition may also be sprayed by means of an atomisation nozzle, which makes it possible to create a mist.

The composition may also be sprayed by means of a spray.

A person skilled in the art knows how to adapt the spray means according to the form of the composition.

A person skilled in the art also knows how to adapt the rate of the spray according to the shape of the room, the ceiling height and the volume to be decontaminated.

Step 2 is a step of verifying the decontamination. For example, this may be done by measuring the concentration in contaminating gas (in ppm) in the atmosphere (gas detector), and/or by check of the pH of the residues. If the composition of the invention comprises a pH indicator, the check on the pH of step 2) can be done visually by means of the coloured indicators, and it is no longer necessary to measure the pH by another method such as with a pH meter or the use of a pH paper. A pH of the residues between 4 and 9 is an indicator of effective decontamination.

Step 4) consists in recovering the solid or liquid residues. Once a residue is obtained, the residue is collected with means normally used by a person skilled in the art, for example using a shovel or a brush, a scraper or by suction according to the solid or liquid state of the residue. A person skilled in the art knows how to adapt the means of collection according to the nature of the residue. Once of the advantages of the invention is therefore an easy recovery of the decontamination residues using everyday utensils.

In particular, it is a case of liquid residues.

One of the advantages of the composition according to the invention is that the residues coming from the decontamination are at a pH between 4 and 9. They are therefore not corrosive for the contaminated premises and non-irritant and non-toxic for the persons in charge of recovering them. The elimination thereof therefore does not require specific and expensive equipment.

The composition makes it possible to neutralise the corrosive gases with a use of a minimum quantity of product and at a lower cost compared with the products of the prior art. In addition, the composition of the present invention has the advantage of not being dangerous for living organisms: it is non-toxic, non-irritant, non-allergenic, and non-ecotoxic), unlike the products of the prior art.

Optionally, a rinsing of the decontaminated area to eliminate the residues of the composition can be implemented as a last step.

The present invention also relates to a device for decontaminating an atmosphere contaminated by a corrosive gas, comprising at least one means 1 able to spray a composition comprising a least one acido-basic neutralising agent for decontaminating an atmosphere contaminated by a corrosive gas, said acido-basic neutralising agent having at least 2 pKa's and being characterised in that:

pKa 1≤pKa 2 pKa 1>2 pKa 2<12

4<½ (pKa 1+pKa 2)<10 pKa 1 representing the smallest of the basic pKa's and pKa 2 representing the largest of the acidic pKa's, and at least one reservoir 3 intended to receive said composition.

Within the meaning of the present application, "at least one" means one, two, three; for or more.

Typically, said composition is a composition as defined above in the present application.

As defined hereinabove, the composition may be in liquid, solid or aerosol form.

The means 1 able to spray the composition may be a spray, an atomisation nozzle, a foam generator or a sprinkler.

In a particular embodiment, the device comprises two reservoirs 3, each one intended to receive the composition in a different form. In such an embodiment, the device therefore comprises two means 1 able to spray the composition, respectively adapted according to the form under which the composition has to be sprayed.

In a more particular embodiment, the device comprises:

- a first reservoir intended to receive the composition in solid form, connected to a means able to spray the composition in powder form, and
- a second reservoir intended to receive the composition in liquid form, connected to a means able to spray the composition in liquid or foam form.

The device may be a portable device. "Portable" means that the device can be moved by a person.

Alternatively, the device may be a fixed device. "Fixed" means that the device cannot be moved by a person. It is a case for example of a device integrated in a building.

In one embodiment of a fixed device, said at least one spray means 1 is connected to at least one circuit 2 comprising a fluid, said at least one circuit 2 itself being connected to said at least one reservoir 3 intended to receive the composition, by means of a valve 4. Actuating this valve 4 located at the junction of the reservoir 3 and of the circuit 2 then allows release of the composition into the circuit, and then spraying thereof through the spray means 1.

In a particular embodiment, the valve 4 also makes it possible to adjust the rate of release of the composition in a controlled quantity.

In a particular embodiment, the composition is in liquid form and the fluid in the circuit is a liquid, in particular water or water comprising an antigel product.

In a particular embodiment, the composition is in solid form, in particular in powder form, and the fluid in the circuit is a liquid, in particular water or water comprising an antigel product.

In a particular embodiment, the composition is in solid form, in particular in powder form, and the fluid in the circuit is a gas, in particular a neutral gas such as nitrogen, air or compressed air.

In a particular embodiment, the composition is in aerosol form and the fluid in the circuit is a gas, in particular a neutral gas such as nitrogen, air or compressed air.

In a particular embodiment, the circuit 2 is a circuit belonging to a fire-extinguishing plant. In other words, in this embodiment, the reservoir 3 is directly connected to the fire-extinguishing plant. This is because it is well known that such a plant comprises among other things a network of pipes, ending up at spray means, which can then also be used as a circuit 2 according to the present invention. This fire-extinguishing plant may be pre-existing in the structure in which the fixed device according to the present invention is installed.

Thus, in a particular embodiment, the decontamination device according to the present invention comprises at least one reservoir (3) connected to at least one circuit (2) comprising a fluid, said at least one circuit (2) being a circuit belonging to a fire-extinguishing plant.

In a particular embodiment, said valve 4 is coupled to a gas-detection system 5 in particular via an automatic control unit 6. This allows automatic actuation thereof.

In a particular embodiment, a compartment is provided between the reservoir 3 and the valve 4. This compartment is intended to receive firstly the fluid coming from the circuit 2 and secondly the composition coming from the reservoir 3, before release into the circuit 2.

When the composition is in liquid form, this compartment makes it possible to dilute the composition before release into the circuit 2.

When said composition is in solid form, for example in powder form, dissolution or dilution of said composition then takes place in said compartment, prior to release thereof into the circuit 2.

It should be noted that the presence of this compartment is optional, the composition, in solid or liquid form, also being able to be directly released into the circuit 2.

Examples of devices are presented in FIG. 1 and FIG. 2.

EXAMPLES

Example 1

An aqueous chemical-decontamination composition is prepared, comprising, as neutralising agent, the following mixture:
  a conjugate base of an acid: EDTA-aluminium disodium complex, the pKa of which is 5.87 at a concentration of 0.1 mol/L, and
  the conjugate acid of a base: boric acid the pKa of which is 9.28 at a concentration of 0.1 mol/L.

This composition is sprayed into an atmosphere contaminated by gaseous HCl, a corrosive acid, manually in an aerosol by a spray at a rate of approximately 175 mL/min and the carrier gas of which is compressed air.

After spraying the composition, the contaminated atmosphere was decontaminated and a contaminant content below the regulatory threshold (Average exposure value: 5 ppm) was obtained.

Figure 3:
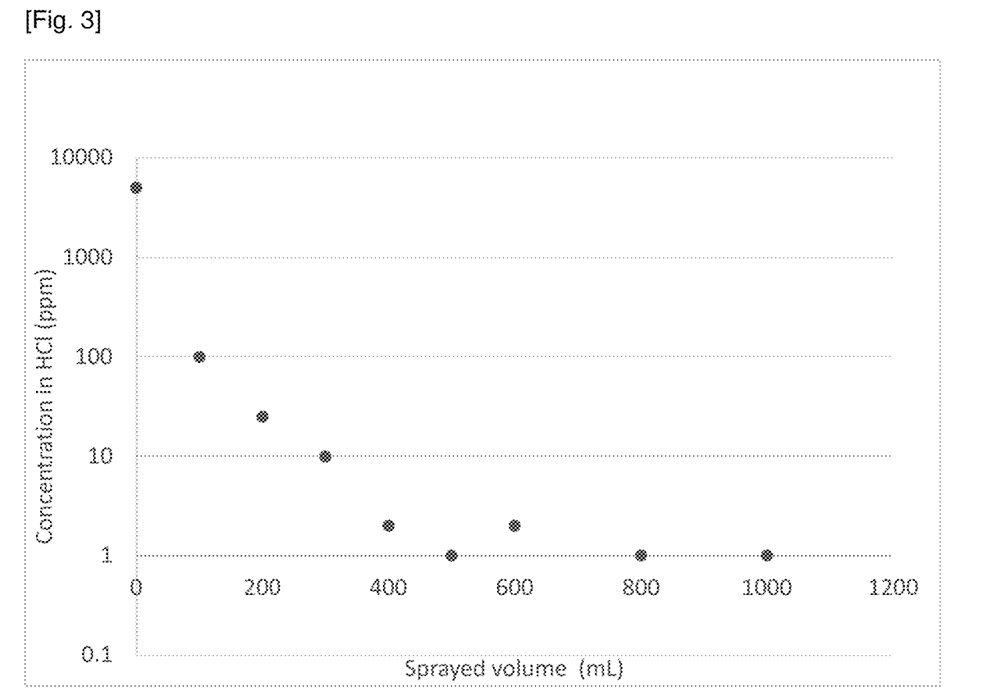
FIG. 3 is a graph showing the change in the concentration in gaseous HCl (ppm) according to the volume (mL) sprayed of a composition comprising a EDTA-aluminium disodium complex and boric acid in an equimolar mixture at 0.1 mol/L.

FIG. 3 shows the change in the concentration in Gaseous HCL according to the volume of the composition sprayed into the atmosphere.

The pH of the liquid residue that falls out is 4, i.e. little acidic and non-corrosive.

Example 2

An aqueous chemical-decontamination composition was prepared comprising, as neutralising agent, an amphoteric agent, sodium glutamate at a concentration of 1 mol/L and the pKa's of which are 4.15 and 9.58. This composition is sprayed into an atmosphere contaminated by a corrosive atmosphere, such as hydrogen chloride.

After spraying of the composition, the contaminated atmosphere was decontaminated and a level of contaminant below the regulatory threshold was obtained.

Example 3

An aqueous chemical decontamination composition is prepared comprising as a neutralising agent, the following mixture:
  a conjugate base of an acid: EDTA-aluminium disodium complex the pKa of which is 5.87 at a concentration of 0.5 mol/L, et
  the conjugate acid of a base: sodium glutamate the pKa of which is 9.67 at a concentration of 0.5 mol/L.

This composition is sprayed via a pump in an atmosphere contaminated by gaseous HCl, a corrosive acid, manually as aerosol by a spray rate of about 375 mL/min.

After spraying the composition, the contaminated atmosphere was decontaminated and a content in contaminant below the regulatory threshold (Average exposure value: 5 ppm) was obtained.

Figure 4:
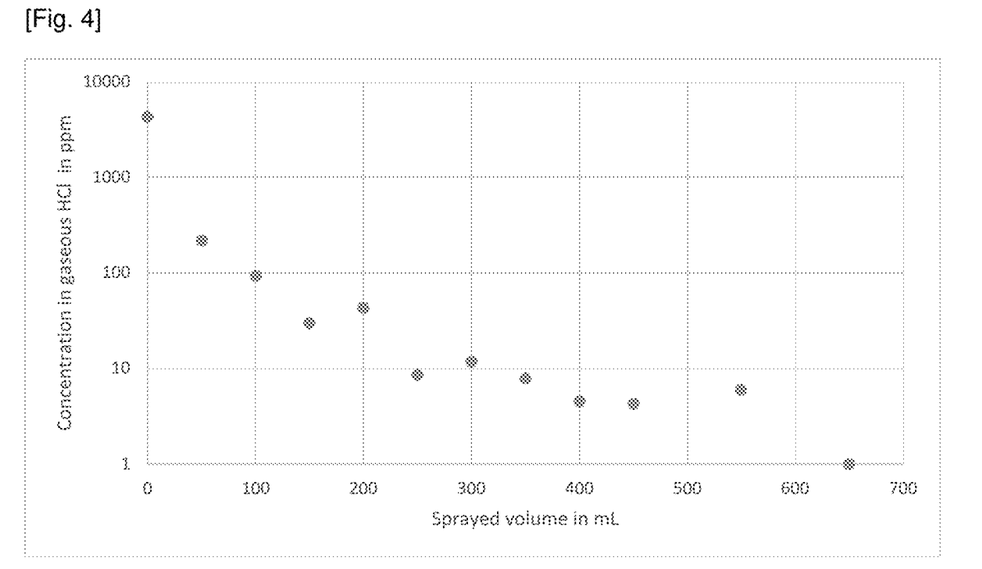
FIG. 4 is a graph showing the change in the concentration in gaseous HCl (ppm) according to the volume (mL) sprayed of a composition comprising a EDTA-aluminium disodium complex and sodium glutamate in an equimolar mixture at 0.5 mol/L.

FIG. 4 shows the change in the concentration in Gaseous HCL according to the volume of the composition sprayed into the atmosphere.

The pH of the liquid residue that falls out is 7, i.e. a neutral and non-corrosive liquid.

Example 4

An aqueous chemical decontamination composition is prepared comprising as a neutralising agent, the following mixture:
  a conjugate base of an acid: EDTA-aluminium disodium complex the pKa of which is 5.87 at a concentration of 0.5 mol/L, and
  the conjugate acid of a base: sodium glutamate the pKa of which is 9.67 at a concentration of 0.5 mol/L.

This composition is sprayed via a pump in an atmosphere contaminated by gaseous $NH_3$, a corrosive base, manually as aerosol by a spray rate of about 375 mL/min.

After spraying the composition, the contaminated atmosphere was decontaminated and a content in contaminant below the regulatory threshold (Average exposure value: 20 ppm) was obtained.

Figure 5:
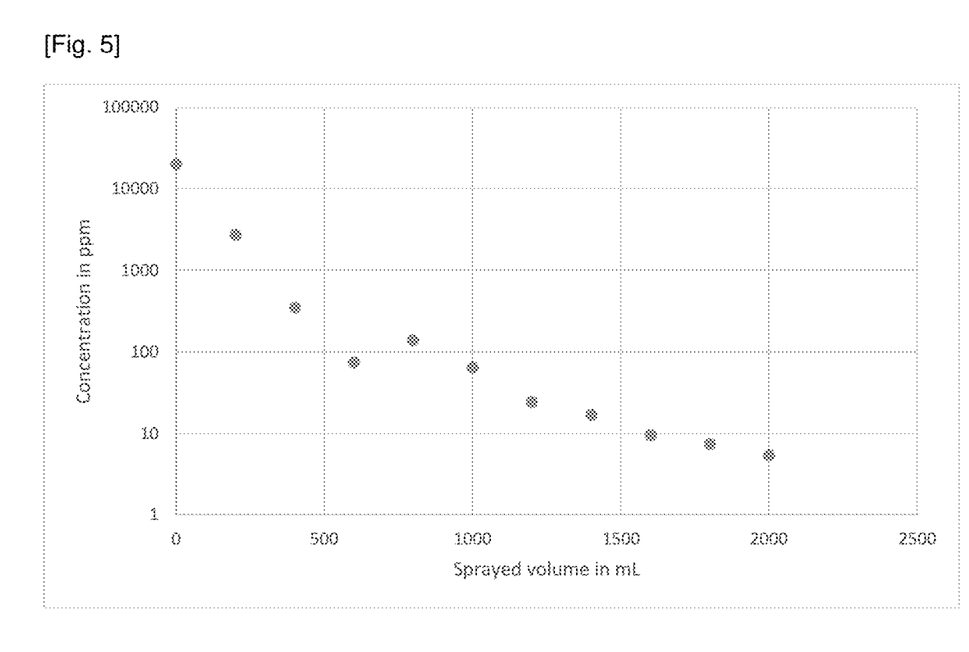

FIG. 5 shows the change in the concentration in gaseous $NH_3$ according to the volume of the composition sprayed into the atmosphere.

The pH of the liquid residue that falls out is between 7 and 8, i.e. a neutral and non-corrosive liquid.

The invention claimed is:

1. A composition comprising at least one acido-basic neutralising agent for decontaminating an atmosphere contaminated by a corrosive gas, said at least one acido-basic neutralising agent being a mixture of at least one conjugate base of an acid and of at least one conjugate acid of a base and having at least 2 pKa's, wherein:
  pKa 1≤pKa 2,
  pKa 1>2,
  pKa 2<12−4<½, and
  (pKa 1+pKa 2)<10,
  pKa 1 representing the smallest of the basic pKa's and pKa 2 represents the largest of the acidic pKa's.

2. The composition according to claim 1, wherein said conjugate acid and said conjugate base are present in an equimolar ratio.

3. The composition according to claim 1, wherein the conjugate base is an EDTA-aluminium disodium complex and the conjugate acid is boric acid.

4. The composition according to claim 1, wherein the conjugate base is an EDTA-aluminium disodium complex and the conjugate acid is sodium glutamate.

5. The composition according to claim 1, wherein said composition is in solution form or in solid form.

6. The composition according to claim 5, wherein said composition in solution form or in solid form is formulated as an aerosol.

7. The composition according to claim 5, wherein said composition in solution form is formulated as a foam.

8. The composition according to claim 1, wherein said composition is sprayed directly into the atmosphere contaminated by corrosive gases.

9. A method for decontaminating an atmosphere contaminated by a corrosive gas comprising the following steps:
1) spraying, directly into the contaminated atmosphere, a composition comprising at least one acido-basic neutralising agent for decontaminating an atmosphere contaminated by a corrosive gas, said at least one acido-basic neutralising agent being a mixture of at least one conjugate base of an acid and of at least one conjugate acid of a base and having at least 2 pKa's and wherein:
pKa 1≤pKa 2,
pKa 1>2,
pKa 2<12-4<½, and
(pKa 1+pKa 2)<10,
pKa 1 representing the smallest of the basic pKa's and pKa 2 represents the largest of the acidic pKa's; then
2) checking the decontamination;
3) optionally repeating steps 1 and 2 until there is total decontamination;
4) recovering the solid or liquid residues; and
5) optionally rinsing the decontaminated zone to eliminate the residues of the composition.

10. A device for decontaminating an atmosphere contaminated by a corrosive gas, comprising:
at least one means able to spray a composition comprising at least one acido-basic neutralising agent for decontaminating an atmosphere contaminated by a corrosive gas, said at least one acido-basic neutralising agent being a mixture of at least one conjugate base of an acid and of at least one conjugate acid of a base and having at least 2 pKa's and wherein:
pKa 1≤pKa 2,
pKa 1>2,
pKa 2<12-4<½, and
(pKa 1+pKa 2)<10,
pKa 1 representing the smallest of the basic pKa's and pKa 2 represents the largest of the acidic pKa's; and
at least one reservoir intended to receive said composition.

11. The device according to claim 10, wherein said at least one reservoir is connected to at least one circuit comprising a fluid, said at least one circuit being a circuit belonging to a fire extinguishing plant.

\* \* \* \* \*